United States Patent [19]
Gauger et al.

[11] Patent Number: 5,224,749
[45] Date of Patent: Jul. 6, 1993

[54] ONE-PIECE UPPER TRACK FOR A POWER SEAT ADJUSTER

[75] Inventors: Derek K. Gauger, Ann Arbor; Kirk K. Horvet, Royal Oak; Phillip Chaban, Grass Lake, all of Mich.

[73] Assignee: ITT Automotive, Inc., Auburn Hills, Mich.

[21] Appl. No.: 876,544

[22] Filed: Apr. 30, 1992

[51] Int. Cl.$^5$ .............................................. B60N 1/02
[52] U.S. Cl. .................................. 296/65.1; 248/429; 297/340
[58] Field of Search ............... 296/65.1; 248/429, 430; 297/473, 344, 340

[56] References Cited

U.S. PATENT DOCUMENTS

| | | | |
|---|---|---|---|
| 4,487,459 | 12/1984 | Rees | 296/65.1 X |
| 4,572,469 | 2/1986 | Rees | 248/430 |
| 4,726,617 | 2/1988 | Nishimura | 296/65.1 |
| 4,821,991 | 4/1989 | Aihara et al. | 248/430 |
| 4,948,189 | 9/1990 | Terada et al. | 296/65.1 |
| 4,969,622 | 11/1990 | Münchow et al. | 248/429 |
| 5,048,787 | 9/1991 | Saito | 248/430 |
| 5,048,886 | 9/1991 | Ito et al. | 296/65.1 |

Primary Examiner—Robert R. Song
Attorney, Agent, or Firm—Robert P. Seitter; J. Gordon Lewis

[57] ABSTRACT

A power seat adjuster includes first and second spaced track assemblies, each formed of an upper track slidably mounted in a lower track anchored to a vehicle floor. Each upper track is integrally formed as a one-piece member and has at least one pair of spaced mounting flanges integrally formed as a part thereof and extending outward from the upper track. Aligned apertures are formed in the mounting flanges to connect a tubular member extending between the track assemblies to the upper track of each track assembly. Another pair of mounting flanges may be formed at the opposite end of each upper track for mounting a second tubular member between and to the upper tracks of the track assemblies.

9 Claims, 5 Drawing Sheets

ONE-PIECE UPPER TRACK FOR A POWER SEAT ADJUSTER

BACKGROUND OF THE INVENTION

1. Field of the Invention

The present invention relates, in general, to seats, and, more specifically, to power seat adjusters for automobile seats.

Powered seat adjusters are a popular option on many automotive vehicles and are frequently offered as standard equipment on higher priced vehicles. Such power seat adjusters are primarily used on the driver's seat and, sometimes, on the front passenger seat of the vehicle.

Such power seat adjusters carry an upper support frame which supports the seat bottom and sometimes the seat back of the vehicle seat. The upper support frame is mounted on first and second, spaced track assemblies, each formed of an upper track which is connected to the upper support frame and is slidably mounted in a lower track anchored to the vehicle floor. A drive mechanism, typically formed of a bi-directional electric motor, is mounted on the power seat adjuster and rotates a pair of drive shafts extending outward from the motor to a gear assembly or box mounted in each upper track. In one arrangement, the gear box rotates a lead screw extending below each upper track. A drive block mounted to the lower track threadingly receives the lead screw to cause reciprocal movement of the upper track and the attached upper support frame upon selective energization of the drive motor. Other drive mechanisms may also be incorporated into the power seat adjuster to provide vertical movement of the seat frame as well as pivotal movement of the seat back with respect to the seat bottom.

Although such power seat adjusters provide easy fore and aft movement of the seat in the lower tracks, it is imperative that the seat remain in a fixed, stationary position during a collision in order to prevent injury to the vehicle passenger using the seat. As a result, the weight and size of the power seat adjuster components are selected to provide a maximum amount of strength to resist any movement under the high impact forces transmitted to the seat from occupant and seat weight inertial loads and, sometimes, through the seat belt during a vehicle collision. Thus, the individual tracks, the torsion tubes or bars typically extending between and interconnecting the spaced upper tracks into a rigid structure and the other components of the power seat adjuster are made with stronger materials and greater thicknesses and dimensions to provide the requisite amount of strength. Although this adds weight and cost to the seat, such efforts have been considered essential to provide adequate strength to the seat to resist movement of the seat during a vehicle collision.

In previously devised upper tracks in a power seat adjuster, separate brackets or flanges have been attached to each upper track to attach various components to the upper tracks, such as to provide attachment of torsion tubes or bars to each upper track. A separate bracket was also employed to mount the metal gear box to the upper track. Such brackets are attached to the upper tracks by welding, or by means of various fasteners, such as rivets, screws, etc. However, the use of separate mounting brackets to attach the torsion tubes to the upper tracks and the processes required to attach such mounting brackets to the upper tracks results in the formation of metallurgical changes or stress risers in the structure of the upper tracks which weaken the upper tracks and could lead to a failure and movement of the upper tracks of the power seat adjuster and thereby the seat and the user during a vehicle collision. Welding utilizes high heat levels which cause metallurgical and dimensional changes in the structure of the upper tracks and can lead to a significant decrease in the strength of the upper tracks. Further, the formation of apertures in the mounting brackets and upper tracks to receive rivets, screws, etc., to attach the mounting brackets to the upper tracks creates stress risers which weaken the structure of the mounting bracket and the upper tracks and can lead to premature failure and separation of the mounting bracket from the upper track.

The horizontal drive mechanism employed to reciprocally move each upper track within a lower track typically includes a gear box attached to the upper track and coupled to the output shaft of the horizontal drive motor to transmit rotation of the output shaft of the drive motor to rotation of the lead screw which, through threading interaction with the drive block attached to the lower track, results in a sliding movement of the upper track with respect to the associated lower track. In order to provide adequate strength, the gear box has been formed of large zinc die castings. Such a construction has been considered necessary to provide adequate strength to the power seat adjuster to resist movement or deformation of the gear box during high impact loads, such as loads occurring a vehicle collision. However, such castings are costly and heavy. Further, the metal-to-metal contact of the gears generates undesirable noise and can create vibrations which are transmitted through the metal components of the power seat adjuster directly to the user of the seat.

Thus, it would be desirable to provide a power seat adjuster which has a lighter weight and fewer components than previously devised power seat adjusters which still retaining sufficient strength to resist movement of the power seat adjuster during impact loads occurring during a vehicle collision. It would also be desirable to provide a power seat adjuster which eliminates additional mounting brackets and associated welding and fastener mounting operations employed in previously devised power seat adjusters to attach the torsion tubes to the movable upper tracks of the power seat adjuster. Finally, it would be desirable to provide a power seat adjuster which has a reduced weight and a lower cost as compared to previously devised power seat adjusters.

SUMMARY OF THE INVENTION

The present invention is a one-piece integrally formed upper track for each of the two track assemblies of a power seat adjuster used in an automotive vehicle seat.

The upper track is preferably formed of a one-piece elongated, integral member. The longitudinally extending side walls of the one-piece member are slidably mounted within a lower track of the power seat adjuster and are formed in a mating, interlocking, sliding relationship with the corresponding side walls of the lower track. At least one and, preferably, two pairs of spaced first and second flanges are integrally formed as part of the top surface of the one-piece member and extend outward from the one-piece member. Each separate pair of first and second flanges are preferably disposed at opposite ends of the one-piece member. Coaxial apertures are formed in the first and second flanges of each pair of flanges for receiving and connecting a tubular torsion member extending between the pair of track assemblies to each one-piece member forming the upper track.

The first and second flanges of each pair of flanges are preferably formed as a stamped and bent portion of the one-piece member during the forming of the one-piece member into its desired shape. This provides an integral structure for the upper track which enables the tubular members, such as torsion tubes extending between opposed track assemblies, to be easily connected to each upper track without the need for additional mounting brackets which have been previously separately attached to the upper tracks by welding, rivets or screws. The integral one-piece upper track of the present invention is lighter in weight than the previously devised upper track assemblies due to the elimination of separate mounting brackets for connection to the tubular torsion tubes as well as having a lower cost due to the elimination of separate mounting brackets and the associated assembly operations used to attach such mounting brackets to the upper track. The one-piece integral upper track of the present invention also provides a high strength to resist deformation or movement during impact loads since the detrimental effects of heating during welding or the creation of stress risers resulting from drilling or stamping operations to form apertures for receiving rivets and screws to attach the mounting brackets to the upper track are eliminated.

In another embodiment, the present invention is a track assembly for a power seat adjuster which includes first and second, spaced, identical track assemblies. Each of the first and second track assemblies includes a lower track which is fixedly anchored to the vehicle floor. The lower track includes opposed side walls formed in a channel-like configuration. A one-piece, elongated, upper track is slidably mounted in each lower track. The upper track has opposed side walls formed in a channel-like configuration which matingly engages the side walls of the lower track for sliding movement of the upper track within the lower track.

At least one, and preferably two, pairs of spaced first and second flanges are integrally formed as a part of the one-piece upper track and extend outward from the top surface of the upper track. Coaxial apertures are formed in each of the first and second flanges for connecting a tubular torsion member extending between the first and second track assemblies to each one-piece upper track.

The one-piece upper track of the present invention overcomes certain problems encountered with previously devised upper tracks used in power seat adjusters which have utilized separate mounting brackets attached to the upper tracks by welding, rivets or screws to provide a mounting connection of torsion tubes to the upper tracks. The integral, one-piece construction of the upper track provides such mounting flange connections for the torsion tubes without the need for separate members thereby reducing the number of separate components in the power seat adjuster and lowering its overall cost. More importantly, the one-piece construction of the upper track with integral mounting flanges for connection to the tubular torsion tubes has a high strength and eliminates any detrimental effects of heating on the metallurgical construction of the upper track or stress risers created by drilling or stamping operations to provide mounting apertures for the rivets or screws which have been used in previous seat adjusters to attach the torsion tube mounting flanges or brackets to the upper tracks. The end result of the present invention is a lighter weight, lower cost upper track for a power seat adjuster which retains a high strength to resist deformation or movement during impact loads imposed on the power seat adjuster.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
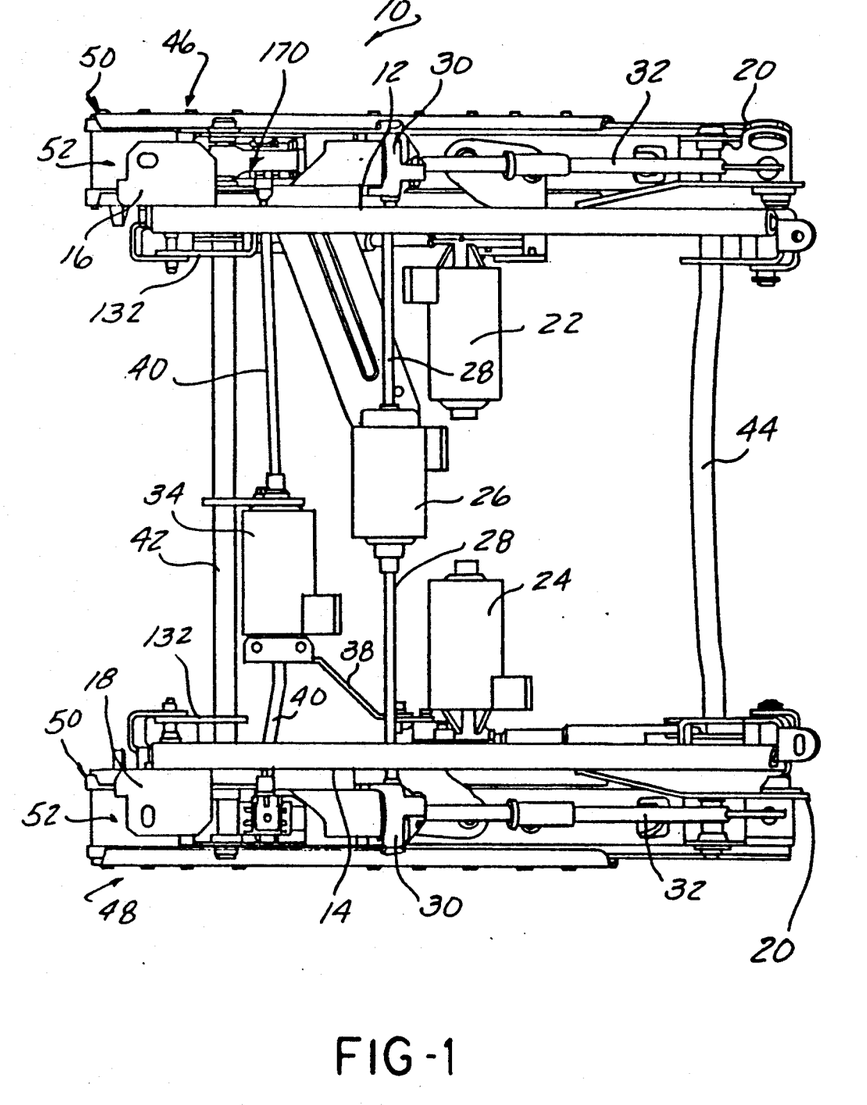
FIG. 1 is a plan view of a power seat adjuster incorporating the one-piece upper track of the present invention.
Figure 2:
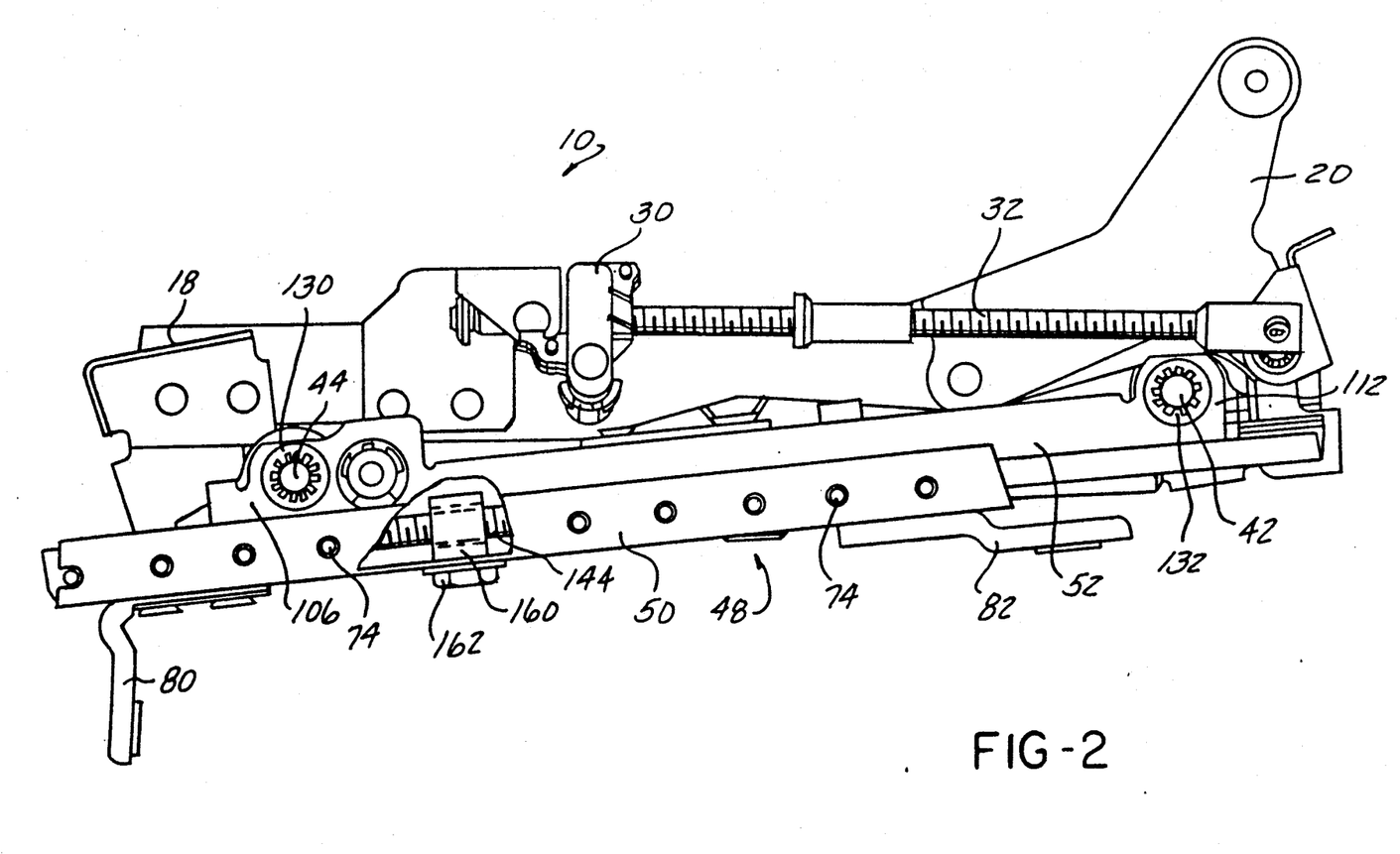
FIG. 2 is a side elevational view of the power seat adjuster shown in FIG. 1.

Referring now to the drawing, and to FIGS. 1 and 2 in particular, there is illustrated a power seat adjuster 10 which variably positions an automotive vehicle seat in any user selected position. The power seat adjuster 10 is a so-called "eight-way" adjuster providing horizontal fore/aft, vertical up and down movement of separate front and rear portions of the adjuster as well as pivotal tilting of the seat back with respect to the seat bottom. It will be understood, however, that the present invention described hereafter is employable with a power seat adjuster which includes at least a horizontal fore-/aft movement and any number of other movements.

As is conventional, the power seat adjuster 10 supports a conventional vehicle seat, not shown, which includes a seat bottom and a seat back. An upper support frame is provided on the power seat adjuster 10 for supporting and connecting the seat bottom and seat back to the power seat adjuster 10. The upper support frame includes a pair of spaced, longitudinally extending frame members or rails 12 and 14. Mounting brackets 16 and 18, for example, are mounted on the ends of the frame members 12 and 14, respectively, and provide a mounting surface for connecting the seat bottom to the upper support frame. A pair of hinge plates 20 are also mounted on the upper support frame and provide a pivot connection between the seat back and seat bottom to permit selective tilting or pivotal movement of the seat back with respect to the seat bottom as is typical in so-called "seat recliners".

Various drive assemblies are mounted on the power seat adjuster 10 to provide selective movement of the power seat adjuster 10 along various axes. For example, front and rear vertical drive motors 22 and 24, respectively, are mounted on the power seat adjuster 10 and connected to conventional lead screws and drive blocks or nuts to move front and rear portions of the vehicle seat to provide selective vertical adjustment of the front and rear portions of the vehicle seat. In addition, a recliner drive motor 26 is interconnected by a pair of rotatable drive shafts to gear boxes 30 which are each coupled to a lead screw 32. The lead screws 32 are connected to one of the pivotal seat back hinge plates 20 mounted on opposite sides of the power seat adjuster 10 to provide selective pivotal adjustment of the seat back with respect to the seat bottom.

More relevant to the present invention is a horizontal drive means formed of a bi-directional electric motor 34 which is fixedly mounted to one of the upper tracks 50 by means of a suitable bracket 38. A pair of rotatable output shafts 40 extend outward from the horizontal drive motor 34 to a rotatable connection with a lead screw by a gear means mounted in opposed track assemblies as described hereafter. The output shafts 40 are, in an exemplary embodiment, flexible steel shafts covered by a polyurethane sleeve.

The power seat adjuster 10 also includes a pair of tubular torsion tubes or members 42 and 44 which extend between and are connected to the opposed track assemblies 46 and 48 and provide a rigid support structure for the power seat adjuster 10. As each of the track assemblies 46 and 48 is identically constructed, the following description will refer to only one track assembly 48. It will be understood that the opposite track assembly 46 is constructed in the same manner.

Figure 3:
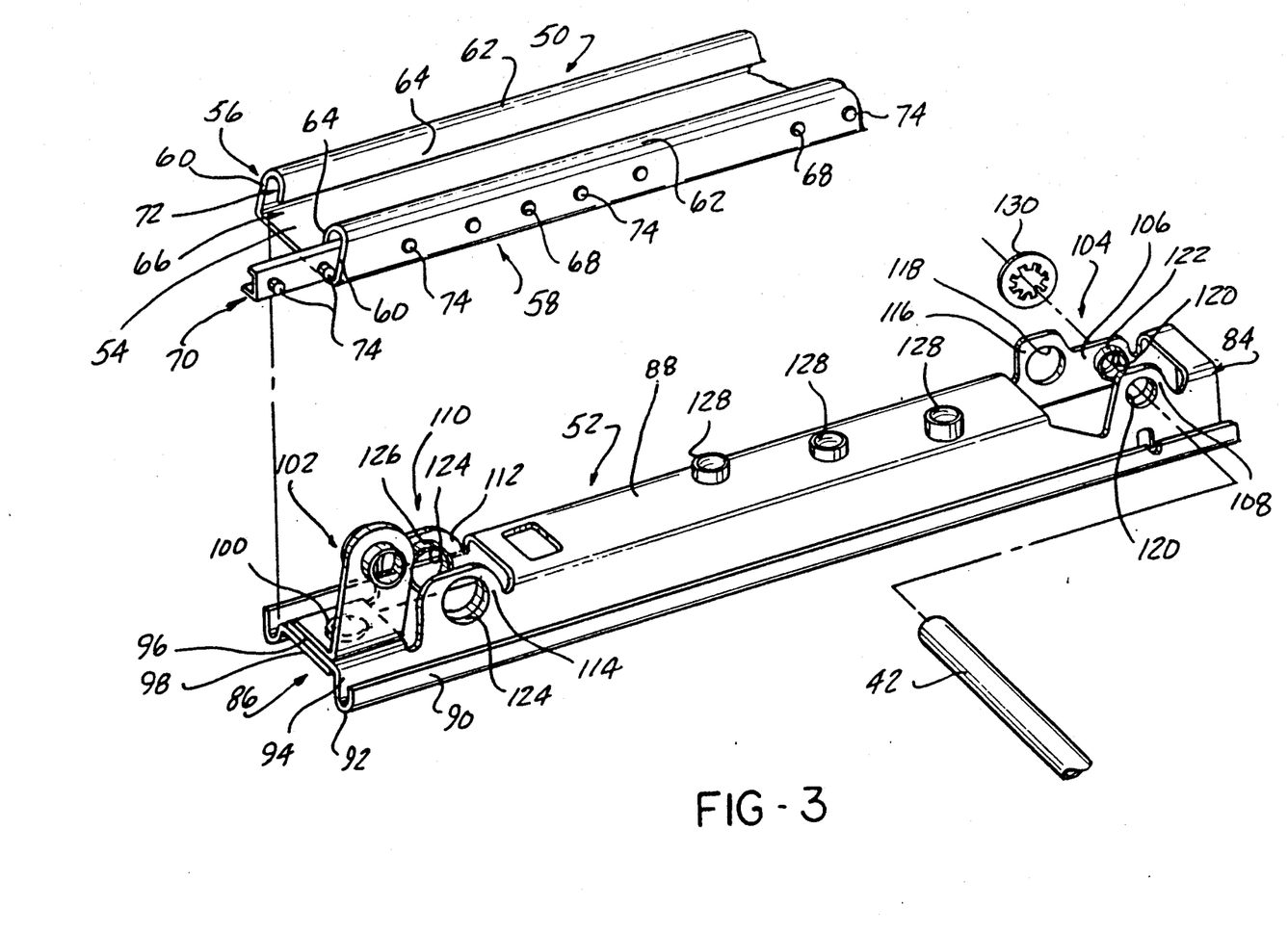
FIG. 3 is an exploded, perspective view showing the construction and mounting of the upper track of the present invention in a lower track.
Figure 4:
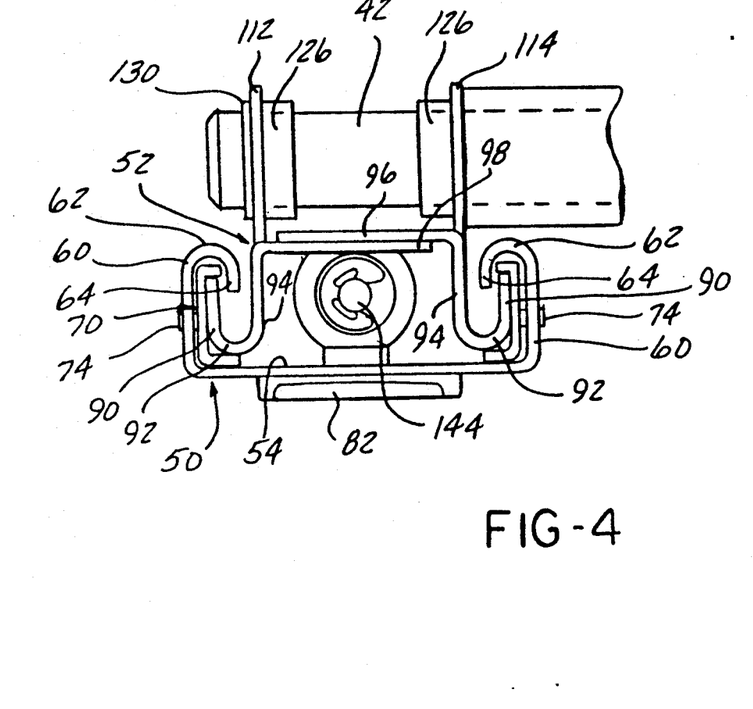
FIG. 4 is a left end view of the assembled upper and lower tracks shown in FIG. 3.

Referring now to FIGS. 1 and 2, and in detail to FIGS. 3 and 4, the track assembly 48 includes a lower track 50 and an upper track 52 which is slidably disposed within the lower track 50 and reciprocatingly movable bi-directionally along the lower track 50 under the control of the horizontal drive means. The lower track 50 is formed of an integral, one-piece member having a substantially planar central wall or web 54 and a pair of identically formed side walls 56 and 58 extending from opposite sides of the central wall 54. Each of the side walls 56 and 58 includes a vertically extending, outer side wall 60, a top wall 62 and an inward disposed lip or wall 64 which extends substantially vertically downward from the top wall 62 and is spaced from the outer side wall 60. The outer side wall 60, the top wall 62 and the inner wall 64 are formed in an inverted J-shape creating and surrounding a longitudinal extending channel 72. The lower edge of the inner wall 64 is spaced from the central wall 54 of the lower track 50 to define a longitudinally extending slot therebetween as denoted by reference number 66.

A plurality of spaced apertures 68 are formed in the outer side walls 60 of each side wall 56 and 58. A slide member 70, only one of which is shown in FIG. 3, is mounted in each channel 72 formed by the spaced portions of the central wall 54, the outer side wall 60, the top wall 62 and the inner wall 64 on opposite sides of the lower track 50. The slide 70 is substantially C-shaped and is complimentary to the shape of the channel 72. The slide 70 is formed of a suitable plastic material to provide a smooth sliding surface for the upper track 52, described hereafter, which is slidingly disposed within the slide 70. A plurality of outwardly extending pins 74 are formed on and extend outward from a side wall of the slide 70 and engage the apertures 68 in the outer side wall 60 of the corresponding side walls 56 and 58 of the lower track 50 to securely and stationarily position the slide 70 within the lower track 50.

As shown in FIG. 2, a front riser 80 and a rear riser 82 are attached to the lower track 50 at opposite ends thereof and provide a mounting connection to the vehicle floor by means of bolts or other suitable fasteners or anchors.

As shown in detail in FIG. 3, the upper track 52 is in the form of an elongated, one-piece, integrally formed member which is stamped, extruded, or otherwise formed from a suitable material, such as a high-strength, low alloy steel.

All of the various portions described hereafter which form a part of the upper track 52 are integrally formed with the entire upper track 52 and form an integral, continuous, unbroken, non-separate, part of the complete upper track 52. The upper track 52 includes a first end 84 and an opposed second end 86. A raised central portion or surface 88 extends between the first and second ends 84 and 86. The side walls of the upper track 52 are formed in a channel-like configuration complimentary to the shape of the channels 72 in the lower track 50 so as to enable the upper track 52 to be slidably disposed within the lower track 50 in sliding contact with the sleeves 70. Thus, each side wall of the upper track 52 is formed with a substantially J-shaped channel configuration formed of an outer side wall 90, a lower bottom wall 92 and an inner side wall 94 which extends to the central raised portion 88. The same channel-like configuration is also provided for the opposite longitudinal side wall of the upper track 52.

During the formation of the upper track 52, which is preferably by a stamping operation, a pair of overlapping flanges 96 and 98 are formed at the second end 86 of the upper track 52. Aligned apertures 100 are formed in each of the flanges 96 and 98 and provide a mounting point for the attachment of a seat belt buckle bracket 102 to the second end 86 of the upper track 52. The seat belt buckle bracket 102 provides an attachment point for a conventional seat belt buckle, not shown.

A first pair 104 of mounting flanges including spaced mounting flanges 106 and 108 are integrally formed in the upper track 52 adjacent the first end 84 thereof. A second pair 110 of mounting flanges including first and second mounting flanges 112 and 114 are integrally formed in the upper track 52 adjacent the overlapped flanges 96 and 98 at the second end 86 of the upper track 52. Each of the pairs 104 and 110 of mounting flanges is cut, such as by stamping, from the same material sheet used to form the entire one-piece upper track 52. After piercing, each pair of flanges 104 and are then bent outwardly from the raised central portion 88 of the upper track 52 so as to be disposed in a substantially vertically extending position when the upper track 52 is mounted in its operating position in the power seat adjuster 10. Each of the mounting flanges 106, 108, 112 and 114 forming the first and second pair of mounting flanges 104 and 110 is substantially identically constructed with the exception of the mounting flange 106 which has an elongated end portion 116. An enlarged aperture 118 is formed in the end portion 116 to enable the drive shaft 40 of the horizontal drive motor 34 to pass therethrough to its connection to the horizontal gear means, as described hereafter.

A pair of co-axial aligned apertures 120 are formed in the mounting flanges 106 and 108 of the first pair of mounting flanges 104. The apertures 120 are preferably formed by an extrusion process which creates an inwardly extending, annular collar 122 extending toward the opposed mounting flange 106 or 108. The aligned apertures 120 provide a mounting connection for the tubular torsion tube 42 to the upper track 52 as described hereafter.

Similar coaxial apertures 124 are formed in the mounting flanges 112 and 114 of the second pair of mounting flanges 110 and are each formed with inwardly facing annular collars 126. The mounting apertures 124 provide a mounting connection for the other tubular torsion tube 44 as described hereafter.

Additionally, a plurality of longitudinally spaced apertures, each having an outwardly extending, annular collar 128 are formed on the raised central portion 88 of the upper track 50 and provide a mounting connection for a bracket used to attach the vertical drive motors 22 or 24 to each upper track 52.

As shown in FIG. 4, each torsion tube, such as torsion tube 42, extends through the aligned apertures in the mounting flanges 112 and 114 and the annular collars 126 associated therewith to in the upper track 52. A fastener 130, such as a conventional push nut, is mounted on the outer end of the torsion tube 42 to securely attach the torsion tube 42 to the mounting flange 112. Referring briefly to FIG. 1, each torsion tube, such as torsion tube 42, is welded to a drive link 132 which is attached to the upper support 16 and spaced from the side wall of the upper track 52.

Figure 5:
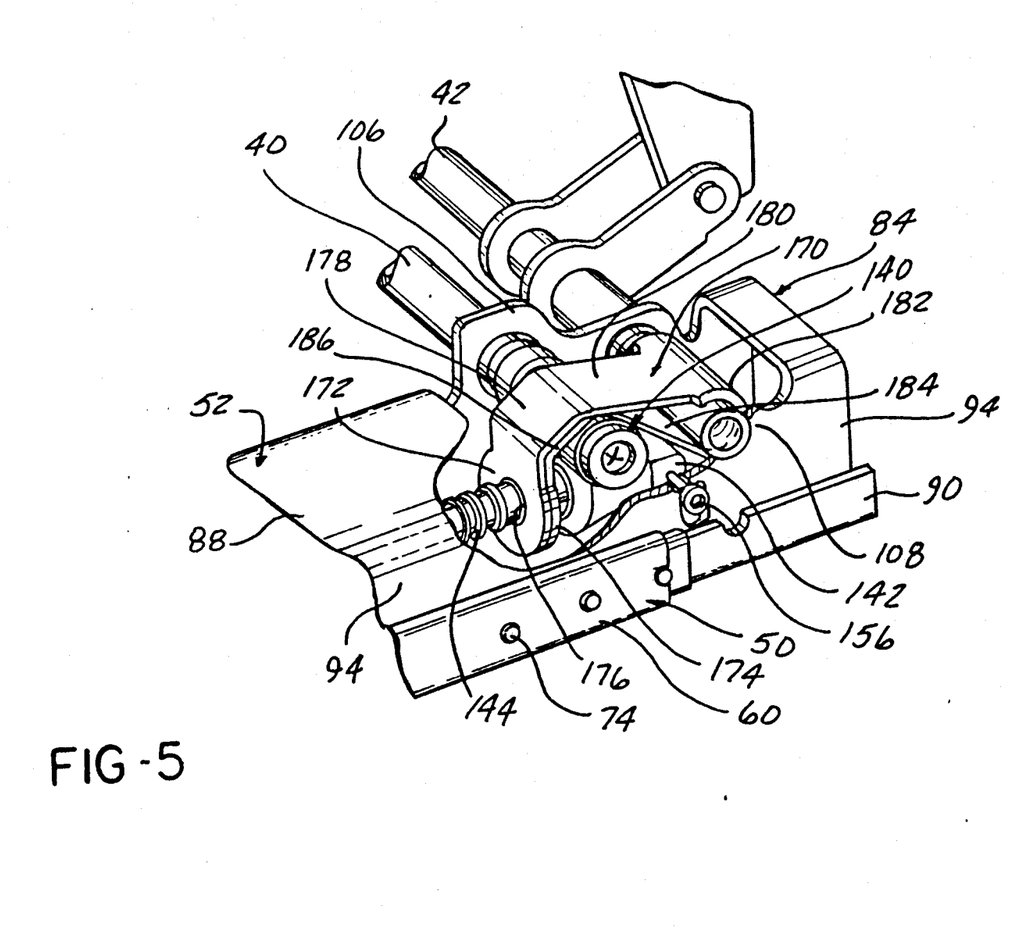
FIG. 5 is an enlarged, partial, perspective view showing a force transmitting catcher bracket according to another embodiment of the present invention.
Figure 6:
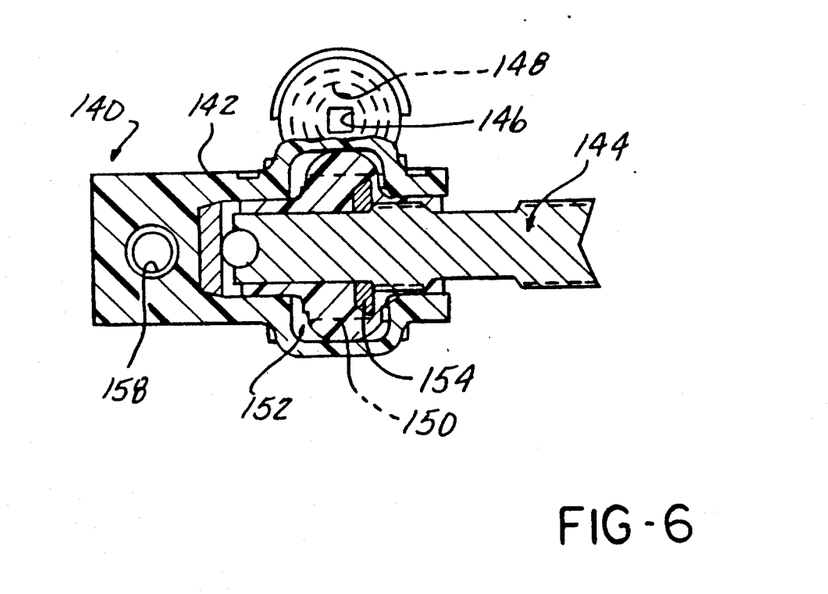
FIG. 6 is an enlarged, cross sectional view showing the gear means of the horizontal drive mechanism of the power seat adjuster.

Referring now to FIGS. 5 and 6, there is depicted a detailed illustration of a portion of the horizontal drive means which moves the upper track 52 in either direction along the lower track 50. A gear means or box denoted generally by reference number 140 is mounted beneath the central raised portion 88 of the upper track 52 adjacent the first end 84 of the upper track 52. The gear box 140 includes a lightweight plastic housing 142 which surrounds internal gears which translate rotation of the horizontal drive motor drive shaft 40 to rotation of the perpendicularly oriented horizontal lead screw 144. By way of example only, a worm 148 and a worm gear 152 are mounted within the housing 142 of the gear box 140. A substantially square slot 146 is formed in the worm 148 and receives one end of the horizontal drive motor output shaft 40. The worm 148 meshingly engages a helix thread 150 formed on the worm gear 152 mounted on one end of the lead screw 144. The worm gear 152 is preferably insert molded about a knurled end portion of the lead screw 144 as shown in FIG. 6. A metallic washer 154 is welded to the end portion of the lead screw 144 within the worm gear 152 to provide additional strength to the gear box 140, for reasons which will become more apparent hereafter. The worm 148 and the worm gear 152 are preferably formed of a high strength plastic, such as DELRIN or NYLON.

A mounting pin 156 shown in FIG. 5 extends through a bore 158 in the housing 142 and engages opposed side walls 94 of the upper track 52 to mount the gear box 140 to the upper track 52.

As shown in FIG. 2, the lead screw 144 threadingly engages a drive block 160 which is stationarily mounted to the lower track 50 by means of a screw or other fastener 162. In this manner, rotation of the lead screw 144 in either direction will result in a linear movement of the upper track 52 with respect to the stationarily positioned lower track 50 through the coupling between the lead screw 144 and the drive block 160.

Referring again to FIG. 5, in another embodiment of the present invention, means are provided for bypassing the gear box 140 and transmitting forces imposed on the upper track 52 around the gear box 140 to the lower track 50. The force transmitting bypass means 170 preferably is in the form of a catcher strap or bracket which may have any suitable shape besides that illustrated in FIG. 5 and described hereafter. The shape of the catcher strap 170 may be varied to provide a predetermined force versus load compliance characteristic such that the catcher strap 170 exhibits controlled elongation under force loading. The catcher strap 170 is preferably in the form of a thin, planar strip formed to the desired shape. The strap 170 is also, preferably, formed of a mild steel.

By way of example only, the catcher strap 170, as shown in FIG. 5, is formed of an integral, one-piece member having first and second ends 172 and 174 bent or formed into an overlapping position substantially in registry with each other. Each of the first and second ends 172 and 174 is identically constructed and has an enlarged, substantially annular shape with a centrally located aperture 176 formed therein. A substantially planar, angularly disposed bent portion 178 extends continuously from the first end portion 172 to a horizontally oriented planar portion 180. The catcher strap 170 loops in an arcuate, loop-shaped portion 182 about the torsion tube 42 extending through the first end 84 of the upper track 52. The arcuate, loop-shaped portion 182 may or may not be in contact with the torsion tube 42. Extending from the arcuate, loop-shaped portion 182 is a second substantially linear portion 184 which merges into an angularly disposed, substantially planar portion 186 disposed adjacent to the angular portion 178. The angular portion 186 merges integrally into the enlarged second end portion 174.

In normal operation of the power seat adjuster 10, the catcher strap 170 merely rests in an inoperative position around the torsion tube 42 and over the gear box housing 142. The enlarged first and second end portions 172 and 174 surround the lead screw 144, with the lead screw 144 extending through the apertures 176 in the first and second ends 172 and 174 of the catcher strap 170 without impediment.

It will be noted that a similar catcher strap 170 could be mounted on the opposite track assembly of the power seat adjuster 10 if a second seat belt buckle mount is desired on the opposite track assembly.

In low load situations, such as those resulting from low or slow speed collisions of the vehicle having the power seat adjuster 10 mounted therein, the bypass means or catcher strap 170 on each track assembly remains in a substantially inoperative condition. During such low load situations, a force will be imparted by the seat belt buckle to the seat belt buckle attachment bracket 102 mounted at the second end 86 of the upper track 52 of one of the track assemblies. This load is then transferred through the seat belt buckle bracket 102 to the upper track 52 and then along the upper track 52 to the gear box housing 142 by the mounting pin 156 attached to the upper track 52. Although the gear box housing 142 is formed of a plastic material, under low load conditions, the gear box housing 142 will remain intact and thereby transmit the load through the worm gear 152 mounted therein to the lead screw 144. From the lead screw 144, the load is transferred through the drive block 160 to the lower track 50 which is securely anchored to the vehicle floor by means of the front and rear risers 80 and 82.

The force transmitting bypass 170 means comes into operation during high load conditions which occur during high speed vehicle collisions. During such high load conditions, the loading is initially the same as that described above in that a force or load will be imparted through the seat belt buckle attachment bracket 102 to the upper track 52. The load is then transferred from the upper track 52 through the mounting pin 156, to the gear box housing 142. However, the high force or load will exceed the strength of the gear box housing 142 thereby fracturing the gear box housing 142. At the same time, during such high load conditions, the upper track 52 is moved forward toward the front of the vehicle which imparts an elongation or tension load on the catcher strap 170. This brings the angular portions 178 and 186 of the catcher strap 170 into contact with the upper portion of the gear box housing 142 thereby causing an elongation of the catcher strap 170 and a controlled straightening of the angular portions 178 and 186 of the catcher strap 170.

Even though the gear box housing 142 is fractured and unable to transmit the load therethrough, the washer 154 which is welded to the end of the lead screw 144 and insert molded within the worm gear 152 remains intact and transfers the load imparted by the first ends 172 and 174 of the catcher strap 170 to the lead screw 144 where it is again transmitted through the drive block 160 to the lower track 50 which is securely anchored to the vehicle floor. In this manner, the forces imparted on the power seat adjuster 10 during low and high speed collisions are effectively transmitted through the various components of the power seat adjuster 10 to the vehicle floor to prevent any undesirable movement of the power seat adjuster 10 and the seat attached thereto during a collision. In the particular situation of a high speed collision which generates high impact forces on the power seat adjuster 10, the catcher strap 170 provides a force transmitting bypass path around the plastic gear box housing 142 which will fracture at a certain load and still enable the load to be transferred through the lead screw 144 and drive block 160 to the lower track 50 anchored to the vehicle floor.

The unique provision of the force transmitting bypass means or catcher strap 170 enables low cost and lightweight plastic gear components to be employed for the first time in a power seat adjuster without any loss in the effective strength of the power seat adjuster which would cause undesirable movement of the plastic gears and gear housing eliminates the higher weight and more costly zinc die cast gear housing required in previously devised power seat adjusters. The catcher strap is simple in construction and low in cost and is easily mounted to the power seat adjuster without requiring any significant modification in the power seat adjuster drive components.

Separately, the one-piece, integral upper track is lower in weight and cost than previously devised upper tracks used in power seat adjusters since the integral formation of the torsion tube mounting brackets with the upper track eliminates the separate attachment of such brackets to the upper tracks and the corresponding weakening of the upper tracks due to welding and/or the formation of apertures in the upper tracks for rivets or other fasteners.

What is claimed is:

1. An upper track for a power seat adjuster having first and second spaced track assemblies, each including an upper track reciprocatingly movable within a lower track by a drive means and at least one tubular member extending between and joined to the upper tracks of each of the first and second track assemblies, the upper track comprising:
   a one-piece elongated member;
   the one-piece member having longitudinal side walls slidably mounted within a lower track;
   at least one pair of spaced first and second flanges integrally formed as a part of the one-piece member and extending outward from the one-piece member; and
   coaxial apertures formed in the first and second flanges for receiving and connecting a tubular member extending between the first and second track assemblies to the one-piece member.

2. The upper track of claim 1 further comprising:
   another pair of spaced first and second flanges integrally formed as a part of the one-piece member and spaced from the one pair of first and second flanges, each of the first and second flanges of the another pair of flanges having coaxial apertures formed therein for connecting another tubular member extending between the first and second track assemblies to the one-piece member.

3. The upper track of claim 1 further comprising:
   each longitudinally extending side wall of the one-piece member having a channel-like configuration slidably engageable with a matingly formed side wall channel on the lower track.

4. The upper track of claim 3 further comprising:
   a plastic sleeve fixedly mounted in each channel of each lower track and interposed between opposed surfaces of the upper track and the lower track.

5. The upper track of claim 1 wherein the first and second flanges comprise:
   a stamped and bent portion of the one-piece member.

6. A track apparatus for a power seat adjuster for a vehicle having a floor, the track apparatus comprising:
   first and second spaced track assemblies, each first and second track assembly comprising:
      a lower track fixedly mounted on the vehicle floor, the lower track including opposed side walls, each formed in a channel-like configuration;
      a one-piece elongated upper track slidingly mounted in the lower track;
      the upper track having opposed side walls formed in a channel-like configuration matingly engageable with the side walls of the lower track;
      at least one pair of first and second flanges integrally formed as a part of the one-piece upper track and extending outward from the one-piece upper track;
      coaxial apertures formed in the first and second flanges; and
   a tubular member extending between and mounted in the aligned apertures of the first and second flanges of each of the upper tracks of the first and second track assemblies.

7. The track apparatus of claim 6 further comprising:
   another pair of spaced first and second flanges integrally formed as a part of the one-piece upper track and spaced from the one pair of first and second flanges, each of the first and second flanges of the another pair of first and second flanges having coaxial apertures formed therein; and
   another tubular member extending between and mounted in the aligned apertures of the another pair of first and second flanges of each of the upper tracks of the first and second track assemblies.

8. The track apparatus of claim 6 further comprising:
   a plastic sleeve fixedly mounted in each channel-like side wall of each lower track and interposed between opposed surfaces of the upper track and lower track.

9. The track apparatus of claim 6 wherein the first and second flanges comprise:
   a stamped and bent portion of the one-piece upper track.

* * * * *

UNITED STATES PATENT AND TRADEMARK OFFICE
CERTIFICATE OF CORRECTION

PATENT NO. : 5,224,749
DATED : July 6, 1993
INVENTOR(S) : Derek K. Gauger et al.

It is certified that error appears in the above-identified patent and that said Letters Patent is hereby corrected as shown below:

On the Title Page, after "[73] Assignee:" please delete "ITT Automotive, Inc, Auburn Hills, Mich." and insert --ITT Corporation, New York, New York--.

Signed and Sealed this

Twenty-first Day of March, 1995

Attest:

BRUCE LEHMAN

Attesting Officer

Commissioner of Patents and Trademarks